US006940523B1

United States Patent
Evoy

(10) Patent No.: US 6,940,523 B1
(45) Date of Patent: Sep. 6, 2005

(54) ON THE FLY DATA TRANSFER BETWEEN RGB AND YCRCB COLOR SPACES FOR DCT INTERFACE

(75) Inventor: David R. Evoy, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 877 days.

(21) Appl. No.: 09/713,412

(22) Filed: Nov. 15, 2000

(51) Int. Cl.[7] .......................... G09G 5/02; G06F 15/00; G06K 1/00
(52) U.S. Cl. ........................................ 345/604; 358/1.9
(58) Field of Search ................................ 345/604, 600; 358/1.9, 448; 382/25.1, 239

(56) References Cited

U.S. PATENT DOCUMENTS

| 4,553,171 A | * 11/1985 | Holladay et al. ........... 382/246 |
| 5,311,211 A | 5/1994 | Simpson |
| 5,581,733 A | 12/1996 | Toda |
| 5,588,075 A | * 12/1996 | Chiba et al. ................ 382/239 |
| 5,774,590 A | 6/1998 | Tomisawa |
| 5,781,242 A | 7/1998 | Kondo et al. |
| 5,805,727 A | 9/1998 | Nakano |
| 5,867,598 A | 2/1999 | De Queiroz |
| 5,875,039 A | 2/1999 | Ohsawa et al. |
| 5,973,707 A | 10/1999 | Mita |
| 5,982,396 A | 11/1999 | Kim |
| 6,028,612 A | 2/2000 | Balakrishnan et al. |

* cited by examiner

Primary Examiner—Kee M. Tung
Assistant Examiner—Aaron M. Richer
(74) Attorney, Agent, or Firm—Michael J. Ure

(57) ABSTRACT

A method for transferring data on the fly between an RGB color space and a YCrCb color space useful for a DCT block-computation engine significantly increases throughput and decreases processor overhead. According to one example embodiment, data is transferred from an RBG color space memory to a YCrCb color space memory in a form useful for presentation to a DCT block-computation engine. In response to accessing the RBG color space memory, the RBG values are asynchronously written to YCrCb intermediate buffers so that one of the YCrCb intermediate buffers is filled through sub-sampling in a manner useful for the DCT block-computation engine while another of the YCrCb intermediate buffers is still being filled. The DCT block-computation engine then accessed the filled YCrCb intermediate buffers while the other of the YCrCb intermediate buffers continues to collect RGB values from the RGB color space memory for the next DCT computation. Other aspects are directed to conversion of the RGB color space to the YCrCb color space using, respectively, a block-by-block conversion, a line-by-line conversion, and a word-by-word conversion.

18 Claims, 8 Drawing Sheets

OVERALL IMAGE SCAN FLOW OF THE TILES

A CLOSER LOOK
EACH SCAN LINE IS 16
PIXELS IN A TILE, FOLLOWED
BY THE NEXT 16 WORDS IN THE SAME TILE

EACH 16 PIXELS INCLUDES A RED, GREEN, AND A BLUE BYTE

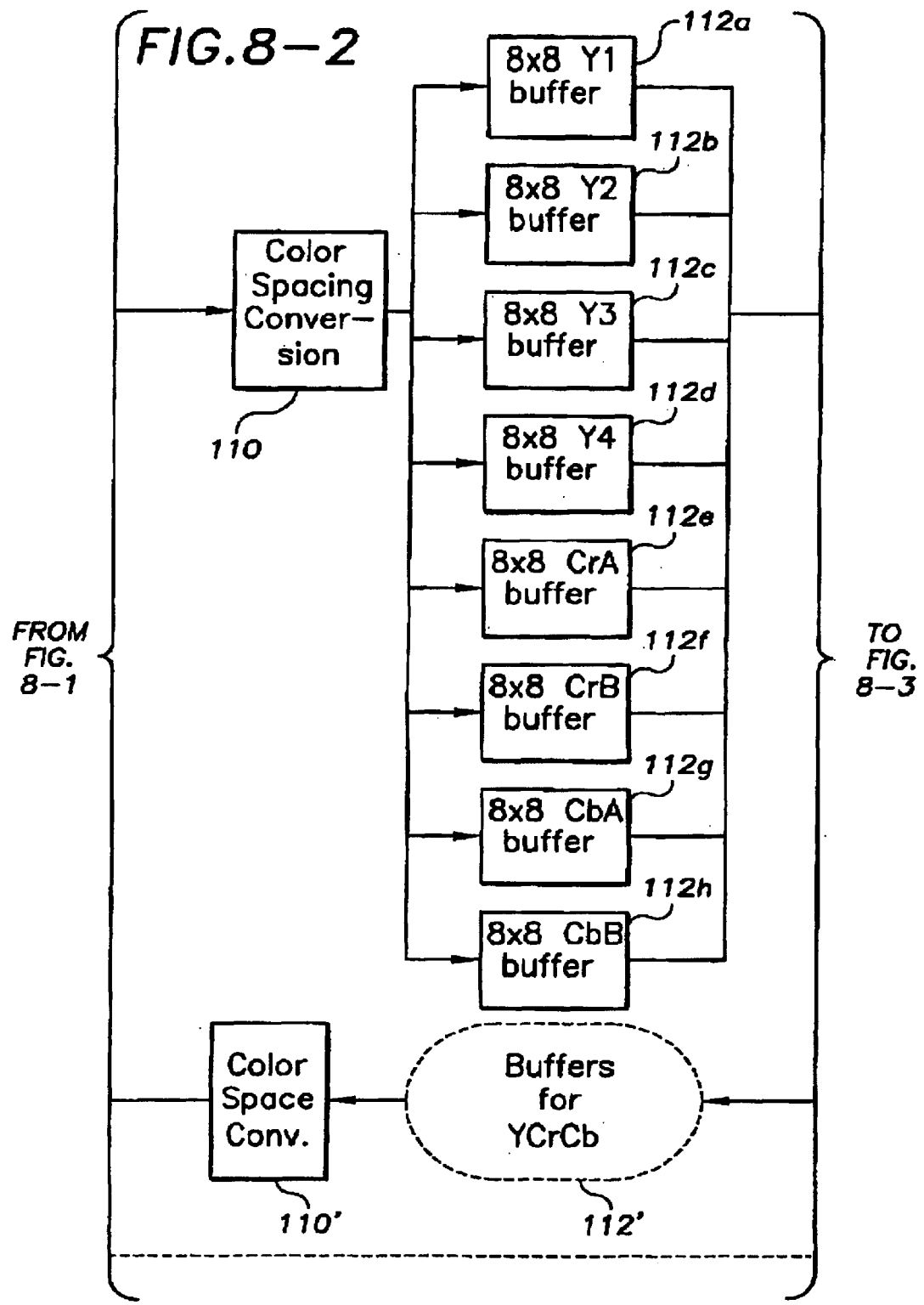

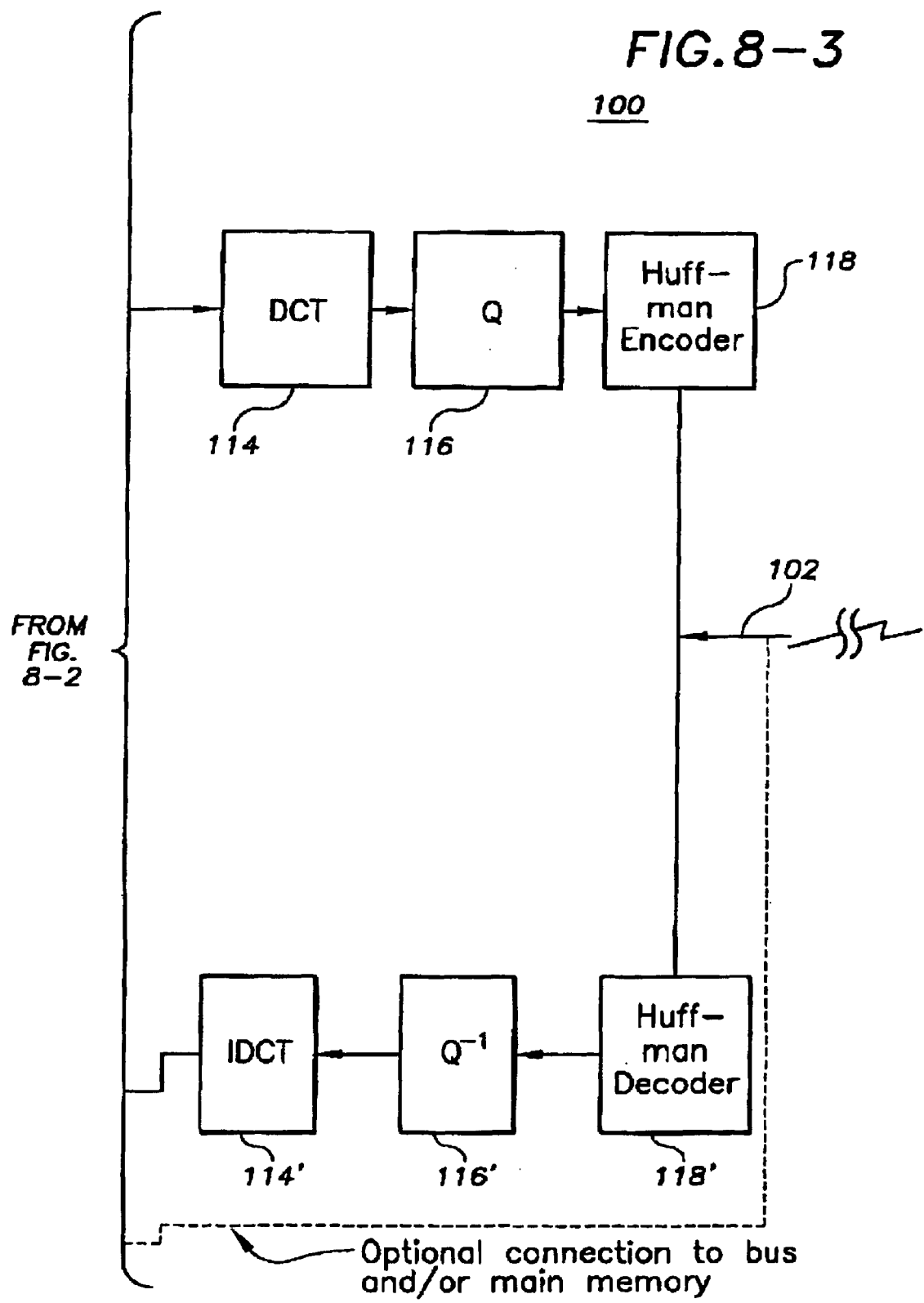

ON THE FLY DATA TRANSFER BETWEEN RGB AND YCRCB COLOR SPACES FOR DCT INTERFACE

RELATED PATENT DOCUMENT

This invention relates to concurrently filed U.S. Patent application Ser. No. 09/656,021, entitled "Data Transfer Between RGB and YCrCb Color Spaces for DCT Interface" (VLSI.287PA), filed on Sep. 6, 2000 issued as U.S. Pat. No. 6,670,960, and incorporated by reference in its entirety.

FIELD OF THE INVENTION

This invention relates to video-data processing and, more particularly, to the conversion of video data between different formats.

BACKGROUND OF THE INVENTION

The electronics industry continues to rely upon advances in semiconductor technology to realize devices that achieve increasingly complex functions at ever-increasing speeds. For many video applications, realizing higher-functioning devices requires moving data quickly between different physical memory spaces and/or different color-representation formats. Depending on the process used for moving such data, the usefulness and overall operability of the device can be significantly enhanced or detrimentally impaired.

Video communications is an example application involving video-data processing having an efficiency rating that depends heavily on how video data is moved between remotely-located terminals. A typical example application would involve first and second remotely-located terminals attempting to communicate video data over a relatively channel having a relatively narrow bandwidth, such as a telephone line. At the first terminal, video data is collected from a source in a format convenient for displaying the data at the first terminal. The collected data is then compressed into a new format and is then transmitted in the compressed format to the second terminal. Before the vide data is compressed, it is converted to a format more adaptable for the compression. The second terminal then decompresses the data into another format convenient for its designated use. The efficiency rating for this type of video-data processing would therefore depend heavily on how the video data is handled as it is converted between formats and moved between remotely-located terminals.

Video-data processing application have improved efficiency ratings using various approaches, some with particular emphasis on the video data compression formatting. A common compression format for video applications is JPEG, which generally uses a YCrCb (luma, chroma red and chroma blue) representation of the color space. However, computers typically display data using a RGB (Red, Green, Blue) color space. The RGB color space is an advantageous color space for display because commodity displays, such as LCDs and CRTs, are controlled via RGB inputs. JPEG uses 8×8 blocks to compress colors. JPEG compression often involves changing from a flat frame buffer in RGB to YCrCb prior to compression. JPEG decompression normally involves providing the YCrCb output from JPEG compressed data and converting to the RGB color space for display purposes.

Previous attempts to increase the efficiency rating in JPEG applications have fallen short of keeping up with some of the high-speed applications required by recent systems. For example, such attempts have involved effective use and management of the busses interlinking the respective processor and the memory units, and the manner in which the processors retrieve each of the three RGB components in the flat frame buffer for respectively converting to each of the three YCrCb components. Other approaches for efficiently moving the data from a memory display buffer in RGB format to the DCT compression stage of a JPEG compression engine have involved use of a DMA with a full-line buffer for directly piping in the RGB components for conversion to each of the three YCrCb components. Each of these approaches has been relatively disadvantageous in the context of expense (as with the use of fill-line buffering with DMAs), the power consumed, and/or the requisite bandwidth of the processor and memory.

Accordingly, these is a need to efficiently move data from a memory display buffer in RGB format to the DCT compression stage of a JPEG compression engine.

SUMMARY

According to various aspects of the present invention, embodiments thereof are exemplified in the form of methods and arrangements concerning the on-the-fly transfer or conversion of data between an RGB color space and a YCrCb color space memory, in one or both directions.

One aspect of the present invention is directed to minimizing external memory traffic without excessive internal memory requirements, thereby lowering cost and improving performance. On-the-fly data conversion between an RGB color space and a YCrCb color space memory for DCT compression is accommodated by performing the requisite multiple steps in line so as to substantially reduce external memory traffic without substantially increasing internal buffering requirements. Instead of implementing the RGB to YCrCb process by creating Y, Cr, and Cb buffers in memory and running the process to complete the YCrCb memory set prior to starting the DCT compression stage, the color space conversion is performed on-the-fly; that is, the data conversion occurs during the compression process thereby providing for extra memory space and freeing up memory bandwidth that might otherwise be required for defining the YCrCb data.

Another particular aspect of the present invention is directed to a specific application wherein the YCrCb color space memory is used for communication with a DCT block-computation engine. In connection with this embodiment and application, aspects of the present invention are directed to methods and arrangements for transferring data between an RGB color space memory to a DCT block-computation engine so as to significantly increase throughput and decrease processor overhead.

In a more specific example embodiment, data is transferred from an RGB color space memory to a YCrCb color space memory in a form useful for presentation to a DCT block-computation engine. In response to accessing the RBG color space memory, the RBG values are asynchronously written to YCrCb intermediate buffers so that one of the YCrCb intermediate buffers is filled through subsampling in a manner useful for the DCT block-computation engine while another of the YCrCb intermediate buffers is still being filled. The DCT block-computation engine then accesses the filled YCrCb intermediate buffers while the other of the YCrCb intermediate buffers continues to collect RGB values from the RGB color space memory for the next DCT computation.

Another in-line conversion is directed to a block-by-block conversion the RGB color space to the YCrCb color space.

The conversion process involves mapping RGB data to YCrCb color space prior to conversion, using four 8×8 blocks from memory for the 8×8 Cr and Cb blocks. To begin a color space and DCT compression, a block of data is converted into four Y blocks, one Cr block, and one Cb block. Two ping-pong prefetch buffers are used to allow the data to be prefetched and color space conversion to occur prior to the JPEG compression. As an optional feature for using the ping-pong buffers for different formats, multiple host-side RGB buffers and multiple target YCrCb buffers provide for adequate data access with a minimum of arithmetic elements.

Other in-line conversion approaches are directed to a specific line-by-line conversion and a specific word-by-word conversion of the RGB color space to the YCrCb color space. Each of these approaches substantially reduces the actual buffer space requirements, and the word-by-word conversion further reduces the total buffer space requirements by eliminating need for a line buffer.

Other specific aspects of the present invention are directed to logic circuits and programmed processor arrangements for executing the above tasks, and yet other embodiments are directed to data transfer to the RGB color space memory from a DCT block-computation engine using, effectively, the reverse operation relative to that which is described above.

The above summary is not intended to provide an overview of all aspects of the present invention. Other aspects of the present invention are exemplified and described in connection with the detailed description.

BRIEF DESCRIPTION OF THE DRAWINGS

Various aspects and advantages of the present invention will become apparent upon reading the following detailed description of various embodiments and upon reference to the drawings in which:

FIGS. 2a and 2b are respective diagrams of the RGB color space and the YCrCb color space as known in the prior art;

Figure 1:
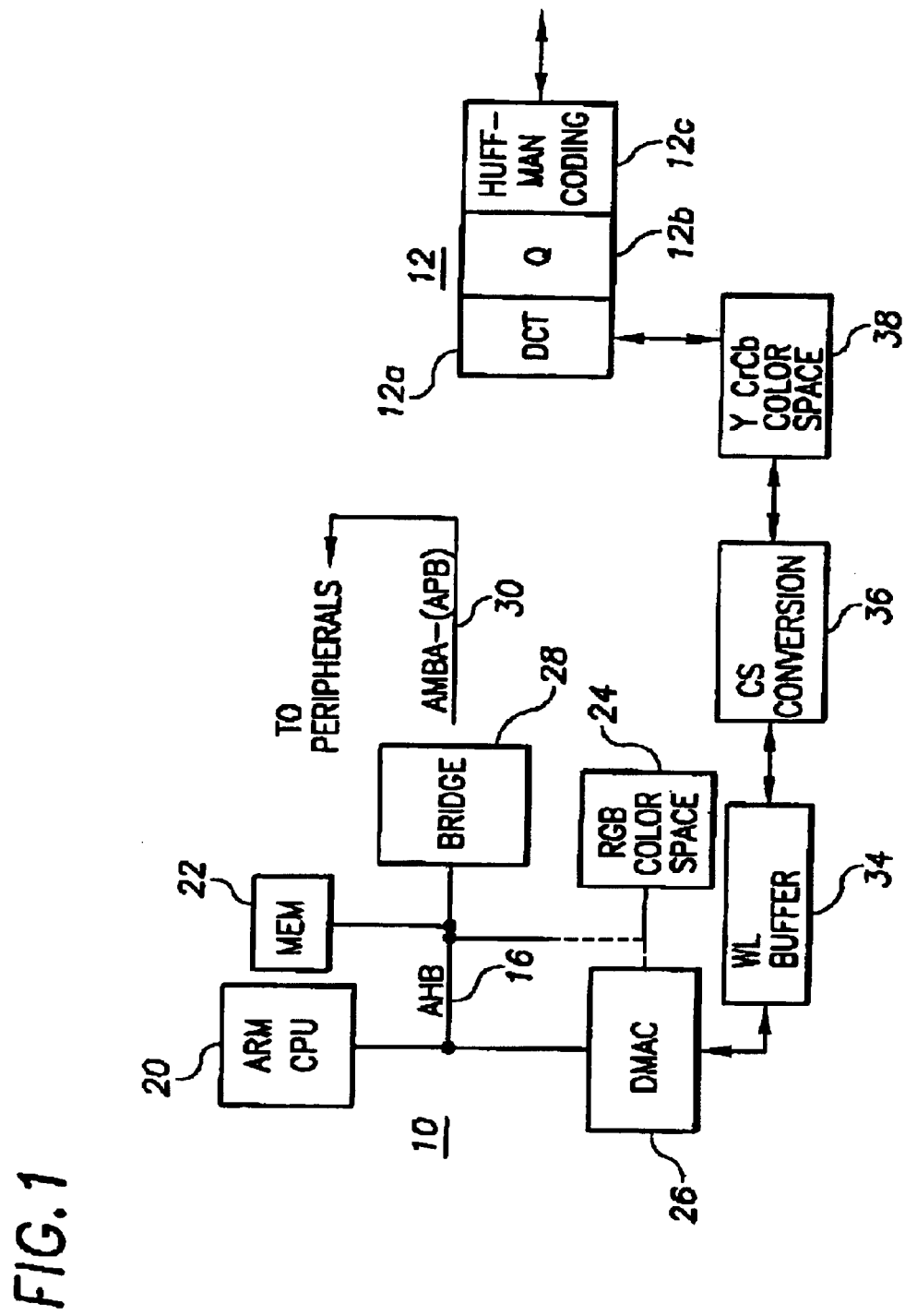
FIG. 1 is a block diagram of a video-processing arrangement, according to an example embodiment of the present invention.

While the invention is amenable to various modifications and alternative forms, specifics thereof have been shown by way of example in the drawings and will be described in detail. It should be understood, however, that the intention is not to limit the invention to any particular embodiment described. On the contrary, the intention invention is to cover all modifications, equivalents, and alternatives falling within the spirit and scope of the invention as defined by the appended claims.

DETAILED DESCRIPTION

The present invention has a variety of applications to video data processing and has been found to be particularly advantageous for use in connection with efficiently moving data between a RGB color space and a YCrCb color space memory, e.g., for presentation to a computation engine that is better adapted to process data in the YCrCb color space memory form. While the present invention is not necessarily limited to such applications, various aspects of the invention can be appreciated through a discussion of example embodiments implemented in this context.

According to one example embodiment, the present invention is directed to a data processing arrangement wherein data is moved between a RGB color space and a YCrCb color space memory that is coupled to a JPEG DCT compression. This embodiment may have different applications. For example, in one instance the data processing arrangement may be adapted to move data from the RGB color space to the YCrCb color space memory for coupling to the JPEG DCT compression, while in another instance the data processing arrangement may be adapted to move data from the JPEG DCT compression in the YCrCb color space memory form to the RGB color space for a display. Data is transferred between the color space memories by fetching data from one of the color space memories and storing the fetched data at the other of the color space memories. One particular application is directed to optimizing a DMA function adapted to fetch data from an external memory representing a RGB color space and to provide the data for a JPEG conversion while performing YCrCb color space conversion on the fly. The internal buffering is minimized by proceeding in an order that allows RGB to YCrCb color space conversion on the fly using, for example, by accessing the RGB data line by line using simple 1024-byte line buffers or word by word using a conventional FIFO arrangement and eliminating the line buffer.

Turning now to the figures and in accordance with the present invention, FIG. 1 illustrates a block diagram of a specific example embodiment of involving high-speed data transfer between an ARM-based data processing arrangement 10 and a DCT computation processor arrangement 12 including, for example, DCT, quantizer and Huffman coding ("encoding and/or decoding") blocks 12a, 12b and 12c, respectively. The ARM-based data processing arrangement 10 includes an AHB (Advanced High-performance Bus) 16 for communication between the ARM CPU 20 and system components including, for example, system memory (e.g., SDRAM) 22, RGB memory 24, and DMA controller (DMAC) 26. A bridge interface 28 is also connected to the bus 16 for communicatively coupling with various peripherals via an AMBA-APB (Advanced Microcontroller Bus Architecture—Advanced Peripheral Bus) 30. Although not necessarily required in all contemplated embodiments and applications, use of a high-speed bus, such as the AHB 16, is particularly useful in matching with the high throughput provided by the color conversion of the present invention. Other data high-performance bussing CPU arrangements that would benefit from implementations of the present invention include, without limitation, IBM's CoreConnect on-chip bus and Motorola's IP-bus.

The dashed lines extending from the RGB memory 24 to the AHB 16 and the DMAC 26 depict alternative data access (read and/or write) paths to the RGB memory 24; i.e., by the DMAC 26 over the AHB 16 or directly by the DMAC 26.

As mentioned above in connection with the previously-discussed embodiments, implementations of the present invention are not limited in converting between the RGB and YCrCb color spaces. As depicted for example by the bi-directional arrows and the Huffman encoding/decoding block, FIG. 1 contemplates conversion from the RGB color space to the YCrCb color space, conversion from the YCrCb color space to the RGB color space, or conversions in both directions. Such conversions are generally shown using three functionally-depicted blocks: word-line buffers 34, a color space conversion computation block 36, and a YCrCb color space 38. These functionally-depicted blocks (as well as other blocks shown in FIG. 1) can be implemented using any of various types of fully and/or partially programmable processors; many implementations, however, are better served using conventional ALU-type (adders, shifter and multiplier) logic in combination with various buffers.

A data processing arrangement such as described above is especially beneficial for video compression formats, such as JPEG (including motion JPEG of which MPEG is a subset), using a YCrCb representation of the color space. JPEG uses 8×8 blocks of colors in a YCrCb color space for processing by the DCT compression stage, whereas computers such as an ARM CPU (20 of FIG. 1) typically store display data using a RGB color space (e.g., memory 24 of FIG. 1). Where JPEG compression normally involves changing from RGB to YCrCb prior to compression, JPEG decompression involves changing the YCrCb output from JPEG to the RGB color space for storage and subsequent display purposes.

Data on a display screen is organized as columns and rows. For discussion purposes, an example display screen might have 480 columns and 240 rows for a 480 by 240 display. Typical display refresh involves fetching the data continuously from the memory for presentation to the display driver and subsequent display on the computer screen. To organize this memory with operational efficiency, the data in memory is arranged starting with the first pixel on the screen to be refreshed, to the last pixel on the screen. Display refresh starts with row 0 column 0, display buffer address 0. The column number is then incremented, until now row 0 column 479 is reached. Display refresh when continues with row 1, column 0 through column 479. This process is continued until the end of the display is reached, and then the process repeats. In a common alternative approach, both the upper and lower halves of the display are refreshed at the same time. In both cases, however, the display data is located in memory in a linear order.

Placing data in the memory in the same order allows the data to be efficiently removed from the DRAM device it is stored in. This follows because DRAM devices are more efficient in retrieving data that is located in the same page as the last data accessed. Most popular DRAMs today are also very order specific and deliver data most efficiently when the data is burst from the DRAM. The display data and DRAM storage techniques work well together in allowing for efficient access of the DRAM data.

With JPEG using 8-pixel by 8-pixel blocks to compress colors represented in a YCrCb color space, it is difficult to extract data efficiently from a DRAM which presents the data in the RGB color space. This difficultly is due to the Cr and Cb data having a subsampling correspondence to the RBG data. The data to be presented to the DCT block for the Y component of the RGB color spaces uses all the R, G and B data from an 8×8 image block, but the data to be presented to the DCT block for the Cr and Cb components of the RGB color space uses all the R, G and B data from a 16×16 image block. To minimize redundant accesses, it is desirable that the data is not fetched multiple times from the RGB color space memory; rather, that the data is fetched only once for a given DCT for efficient processing by hardware circuitry.

Figures 2A, 2B:
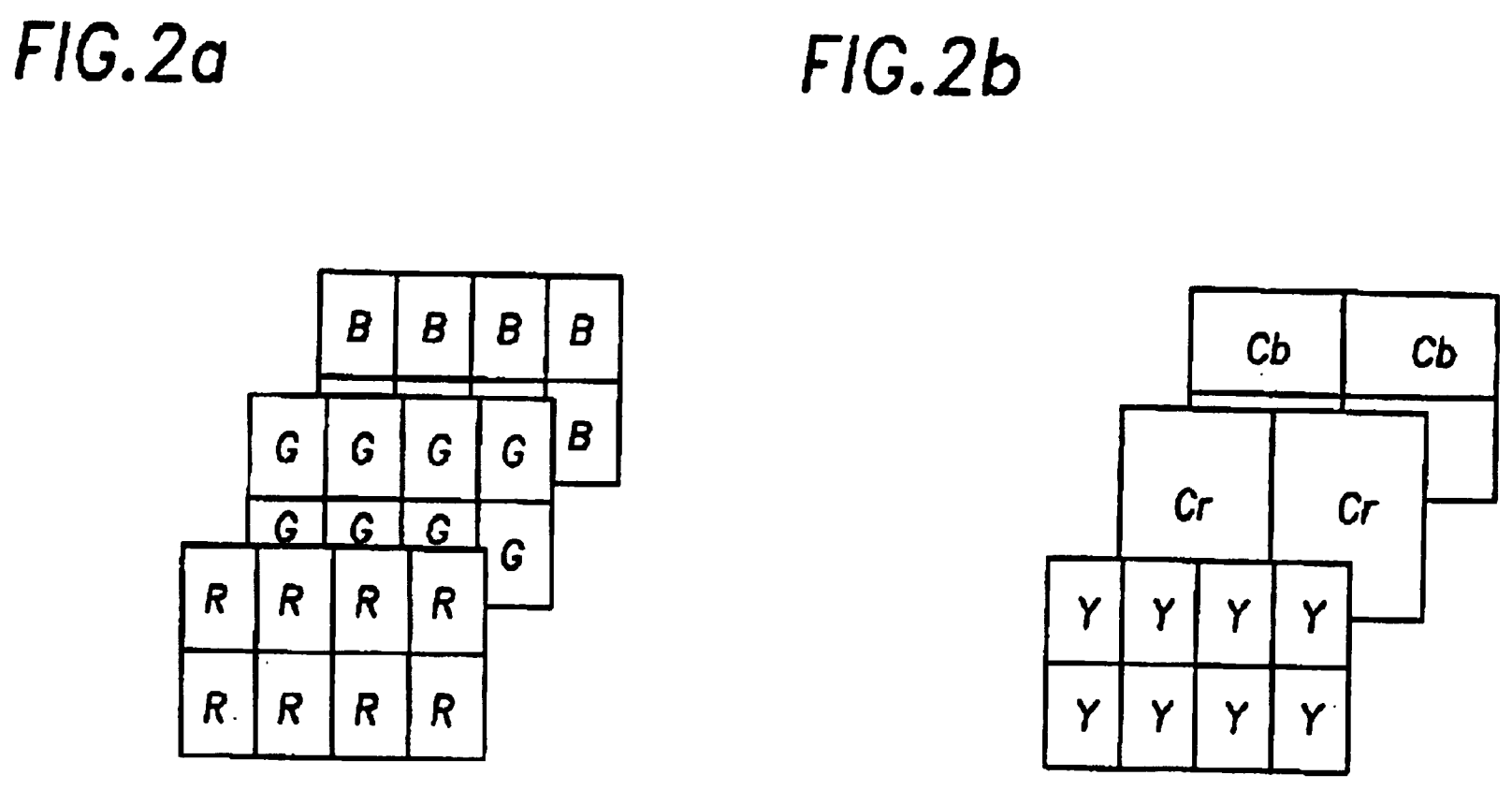

As depicted in the respective diagrams of FIGS. 2a and 2b, the RGB color space format of FIG. 2a depicts 8 locations on a screen that display color in RGB format. For each location on the screen, there is a red, a green, and a blue value. The YCrCb color space format of FIG. 2b depicts the YCrCb color space that is typically used with JPEG color image storage. The Y data on the left is the luminance comprised of 0.299R+0.587G+0.114B and is intended to be proportional to the response of human eyes to brightness. The diagram of FIG. 2a has a total of 24 values, and the diagram of FIG. 2b has 12 values. This difference is because the Cr and Cb data is subsampled; that is, for each set of values in RGB there is one Y value, and for each four sets of data in RGB there is one Cr and one Cb value. JPEG compresses 8×8 arrays of Y, Cr, and Cb data, uses a 8×8 block from memory for the Y data, and a 16×16 block compressed to be a 8 by 8 blocks for each of the Cr and Cb data. The varying data size requirements for the different data types complicates the requirements to fetch this data from memory. It should also be noted that the Y data requires all three R G and B values to make the Y value, and the Cr and Cb data each need all three R G and B from 4 locations, (12 values), to make a single Cr or Cb value. It is advantageous for power and performance reasons not to require fetching this data from SDRAM multiple times.

Figure 4:
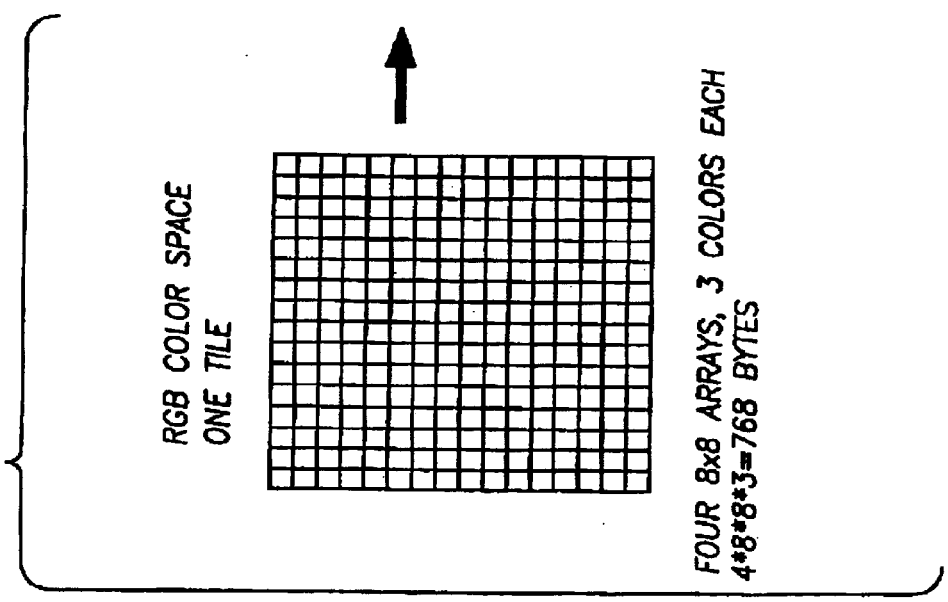
FIGS. 3 and 4 are diagrams of a tile conversion, according to an example embodiment of the present invention, depicting the conversion of four 8×8 arrays in RGB color space (FIG. 3) to four 8×8 Y arrays for DCT compression, one 8×8 Cr array, and one 8×8 Cb array (FIG. 4)
Figure 3:
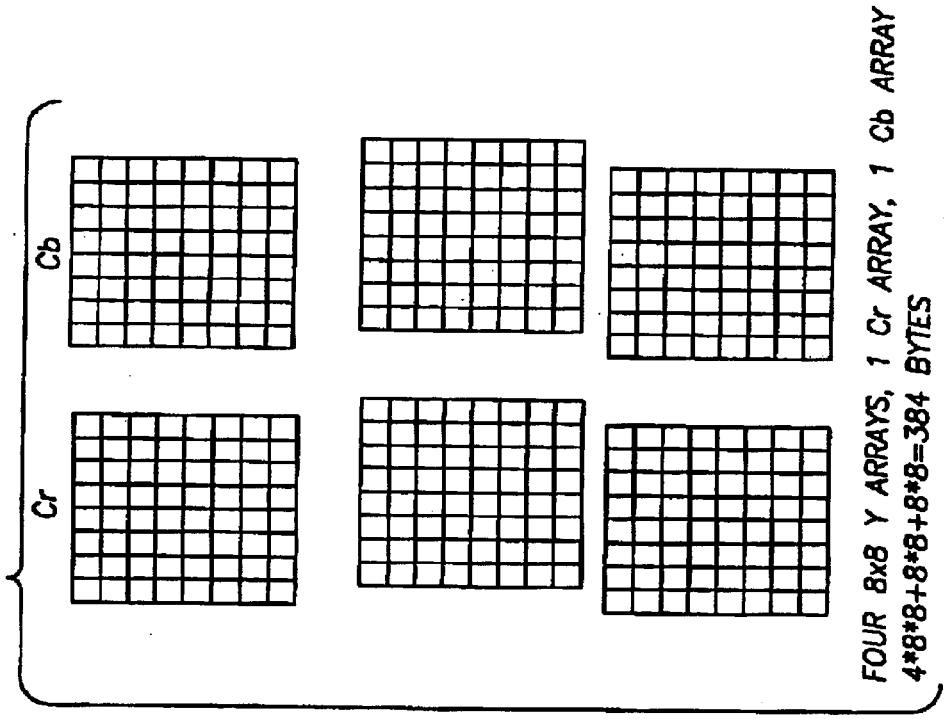

FIGS. 3 and 4 are respective diagrams of a "tile" conversion, according to an example embodiment of the present invention. FIG. 3 depicts four 8×8 arrays in RGB color space, and FIG. 4 depicts a group of four 8×8 Y arrays, one 8×8 Cr array, and one 8×8 Cb array. This group of six 8×8 arrays of FIG. 4 can be readily processed by a DCT computation engine, for example, for data compression. In this instance, the term "tile" refers to the 16 by 16 section of RGB values in display memory as shown in FIG. 3. Thus, a 16 by 16 section of RGB values in display memory (referred to as a tile in this example) is used to create four 8 by 8 Y arrays for DCT compression, one 8 by 8 Cr array and one 8 by 8 Cr array.

Figure 5:
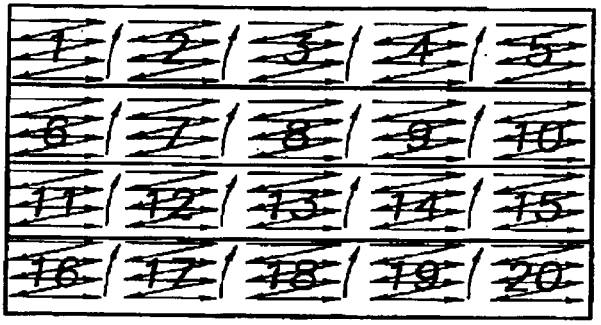
FIGS. 5, 6 and 7 respectively illustrate an image scan flow of tiles, according to an example embodiment of the present invention, at the tile array level (FIG. 5), the tile level (FIG. 6) and the scan line level (FIG. 7)
Figure 6:
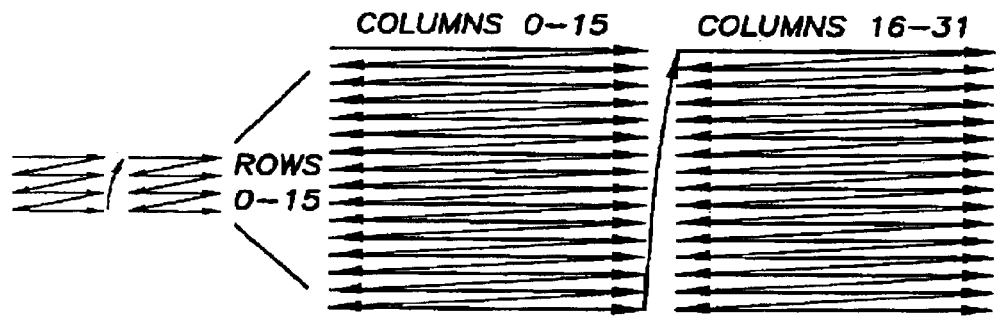
Figure 7:

FIGS. 5, 6 and 7 respectively illustrate increasingly more detailed views of the manner in which data is scanned during a tile conversion, such as depicted in connection with FIGS. 3 and 4. Each tile, as well as the overall array of tiles, is scanned from left to right and top to bottom with each individual tile being completely scanned before proceeding to the next tile. FIG. 5 illustrates a display screen with an overall image scan flow of an array of twenty tiles (five columns by four rows of tiles), according to an example embodiment of the present invention. FIG. 6 shows two of the tiles in FIG. 5, with each scan of a tile traversing a 16 by 16 section of pixels. FIG. 7 illustrates the scan path for two rows of 16 pixels in one of the above-illustrated tiles, with each pixel including data for the red, green and blue value. Each scan line is 16 pixels in a line, followed by the next 16 words in the same tile.

Accordingly, the scan path has been optimized to allow for: 1) data fetching from memory only once; 2) minimizing buffer requirements where a complete row buffer is not required; 3) data fetching from memory in a manner that is SDRAM friendly; and 4) RGB to YCrCb calculations being completed with minimum buffering and performed on the fly, therein further minimizing buffer requirements.

In accordance with another aspect of the present invention, DMA addresses are generated as a function of the above relationship. For illustration purposes, one example implementation has data in RGB color space memory organized on 32 bit boundaries with 8 bits of each color Red, [23:16], Green, [15:8], Blue, [7:0]. Further, this example implementation performs compression using corresponding data in a YCrCb color space, where each Y value corresponds to one RGB value, each Cr value corresponds to 4 RGB values, and each Cb value corresponds to 4 RGB values.

Using a DMAC controller (e.g., 26 of FIG. 1) to address the RGB color space memory (e.g., 24) for fetching the appropriate RGB data, a calculation is performed. For this implementation, a tile is the data in memory corresponding to the area on the screen that is used for data for a single DCT for the Cr or Cb data. Because the Cr and Cb data is subsampled, this same area also generates four 8×8 DCTs for Y data; hence, a single tile is sued to generate data for six DCTs. One way to determine how to calculate the address for fetching the data from the RGB memory is described and illustrated in the above-referenced patent document filed on Sep. 6, 2000.

To enhance the efficiency of the data-conversion process reduce the amount of memory required to implement the process, in accordance with the present invention, in-line or on-the-fly color space conversion is implemented using a block-by-block transfer, via a line-by-line approach or a word-by-word approach.

The conversion process begins with RGB 24 bit data for mapping to YCrCb color space prior to conversion. The 8×8 blocks for Cr and Cb use 4 8×8 blocks form memory. To begin a color space and JPEG compression, a block of 16 32 bit words by 16 words is used. This data is then be converted into 4 Y blocks, 1 Cr blocks, and 1 Cb block. Two ping-pong prefetch buffers are used to allow the data to be prefetched and color space conversion to occur prior to the DCT (e.g., as applied to JPEG) compression. Each ping-pong buffer is a minimum of 768 bytes. To make the buffers useful for formats other than 24 bits unpacked RGB, 32 bit memories can be used with 1024 byte buffers. This approach includes 4 buffers, 2 "host-side" RGB buffers, and two "target" YCrCb buffers to allow real ping-pong operations with a minimum of arithmetic elements.

To substantially reduce the actual buffer space, the following example implementation assumes a SDRAM that is optimized for 16 byte bursts, a JPEG compress operation, 24 bits RGB aligned on 32 bit boundaries, and an 8×8 block used to perform a DCT. This example implementation further assumes that the RFG data is not separate in memory, and a goal to minimize the bus/SDRAM traffic. In this context, it could be necessary to fill one of the 1024 byte buffers discussed above.

Each row is fetched as four 16-byte accesses from the SDRAM (e.g., in two 32-byte bursts or a single 64-byte burst). The beginning of a new compression 'block', row 0 of the 8×8 block, is fetched. This access employs two SDRAM bursts and results in one row of three blocks, that is row 0 for R, G, and B. This first row of the second block is then fetched, for subsequently calculating the YCrCb color space, and the data for the Cr and Cb arrays are subsampled. The next two read operations from SDRAM are from row 1, which does not sequentially follow the previous access in DRAM space; i.e., the read operations from row 1 do not contiguously follow the read operations from row 0 in memory. The current read operations are for row 1 of the first block followed by row 1 of the second block.

Another important aspect of the present invention is an option at this time either to continue this data processing or immediately perform the color space conversion on this subset of data. To reduce buffer size requirements, the color space conversion is done as soon as two rows of two blocks are available, thereby using a front end with 128 bytes (corresponding to 8 times 2 rows, times 4 bytes per pixel, times two rows). Note that there are a substantial number of multiples, adds, and other conversions in this color space conversion. Each 128 'byte' buffer will be translated in hardware to 4 partial blocks, in this case Row 0 and Row 1 of the first two blocks of Y values, and Row 0 only of a single Cr and a single Cb block. This corresponds to 8 times 4 bytes for the Y array, 8 bytes for the Cr array, and 8 bytes for the Cb array, for a total of 48 bytes. Thus, with this partial collection of data, the compression has already begun, while at the same time realizing significant power savings. This process continues for eight passes. Half way through the process, two of the buffers can be released to be compressed (the first two Y blocks are available after 8 rows are processed). If the whole set of 6 buffers runs to completion, the memory requirement is 384 bytes, which is a substantial reduction in buffer requirements relative to the conventional approach of buffering the RGB data before beginning the compression. Accordingly, this conversion approach substantially reduces the transfer to external memory while using minimal internal buffers.

Figures 1, 8:
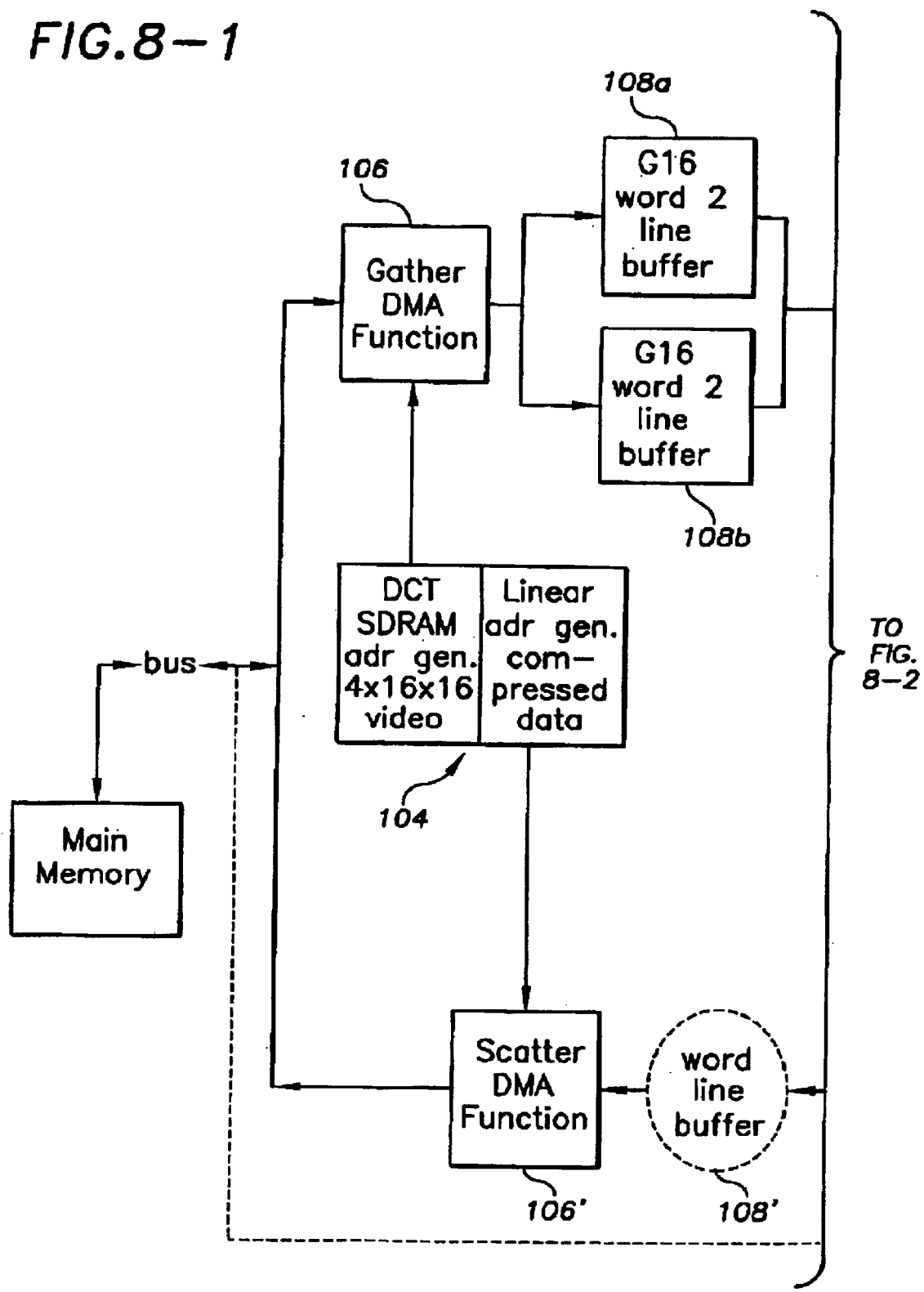
FIG. 8 is a diagram of an example circuit showing processing paths involving buffering of 8×8 blocks for compression and decompression, in accordance with the present invention.

FIG. 8 illustrates an example circuit 100 for efficiently moving data between a RGB color space and a YCrCb color space memory using the above-described line-by-line approach. The upper portion of FIG. 8 illustrates the previously described data flow from an RGB space to converted form for a DCT computation engine, using channel 102, which is typically adapted to feed a high-speed driver (not shown) communicatively coupled to a remote terminal. The lower portion of FIG. 8 illustrates the inverse data flow, in compressed form through the channel 102, to an inverse DCT ("IDCT") computation engine for decompression into DCT blocks (YCrCB color space) for conversion to an RGB space.

More specifically, circuit of FIG. 8 includes a DCT SDRAM address generator 104 which is adapted to fetch data from the RGB color space memory (not shown) for compression and to store data in the RGB color space memory after decompression. At block 106, the fetched RGB data gathered and distributed, e.g., by a DMAC, to line buffers 108*a* and 108*b* for presentation to block 110 which computes the color space conversion values for their presentation to the four Y buffers 112*a*–112*d* and the pairs of CrA and CrB buffers 112*e*–112*h*. As these buffers 112*a*–*h* are filled, they are accessed as DCT blocks for compression by the DCT block 114, the quantizer 116 and the Huffman decoder 118. In many applications, a data multiplexer (not shown) is used to present the video data along with data from other parallel sources for transmission via the channel 102.

The data-processing path from the channel 102 to the RGB color space memory follows inversely from the above discussion, and FIG. 8 denotes the corresponding blocks (e.g., block 110 corresponds to block 110'). Where the compression/decompression functions are processor-implemented, for example, using a specialized or dedicated DSP, many applications share these hardware resources. The above-reference patent document can be referenced for further details regarding the operation of this circuit arrangement of FIG. 8.

While the above line-by-line conversion approach substantially reduces the total buffer space requirements, another aspect of the present invention is directed to performing conversion on a word-by-word basis. This approach can be implemented to lower the buffer requirements further by eliminating the above-discussed line buffers, as may be recognizable from the above-discussion for the presentation of the RGB data for the Y array. For the Cr and Cb data, two rows and two columns of the RGB space is spanned. Accessing such data in a manner that uses the SDRAM and busses as burst devices offsets the need to access sequentially the RGB for a single Cr or Cb calculation. Providing some storage is therefore advantageous.

According to this example implementation of the word-by-word conversion approach, the Y value is calculated on the fly, and pairs of RGB values are accumulated on even numbered rows (such as row 0), as follows:

$$RGBst(0)=RGB(0,0)+RGB(0,1)$$

$$RGBst(1)=RGB(0,2)+RGB(0,3)$$

This sequence continues until the end of the row;

$$RGBst(7)=RGB(0,14)+RGB)0,15)$$

Where

RGB(r,c) is a RGB value, r is row, c is column

RGBst(n) is a value in the RGB fifo

RGB(0,0)+RGB(0,1) is [R(0,0)+R(0,1), G(0,1), B(0,0)+B(o,1)

Storage for the above data is 8 RGB values. To maintain precision, 9-bit numbers are used.

The above-discussed data is in a desirable sequence for building a block to be presented to a DCT block and is also consistent with the ideal of minimizing memory requirements and memory-access burdens.

During the above 16 cycles, 8 partial RGB results have been calculated, and in parallel, 16 Y values have been calculated.

The process continues with the row 1, and with 16 more RGB values $$RGBtotal=[RGB(1,0)+RGB(1,1)+RGBst(0)]$$

$$RGBtotal=[RGB(1,2)+RGB(1,3)+RGBst(1)]$$

etc., till end or row;

$$RGBtotal=[RGB(1,14)+RGB(1,15)+RGBst(7)]$$

Each RGB total is divided by 4 and converted into two values, Cr and Cb

Note that the RGB(1,0) and RGB(1,1) can be added on the fly, requiring only a single storage location for a RGB value. The RGBst(n) is just the subtotals from the Row 0 pass, and this buffer can be implemented, for example, using a simple FIFO.

Figure 9:
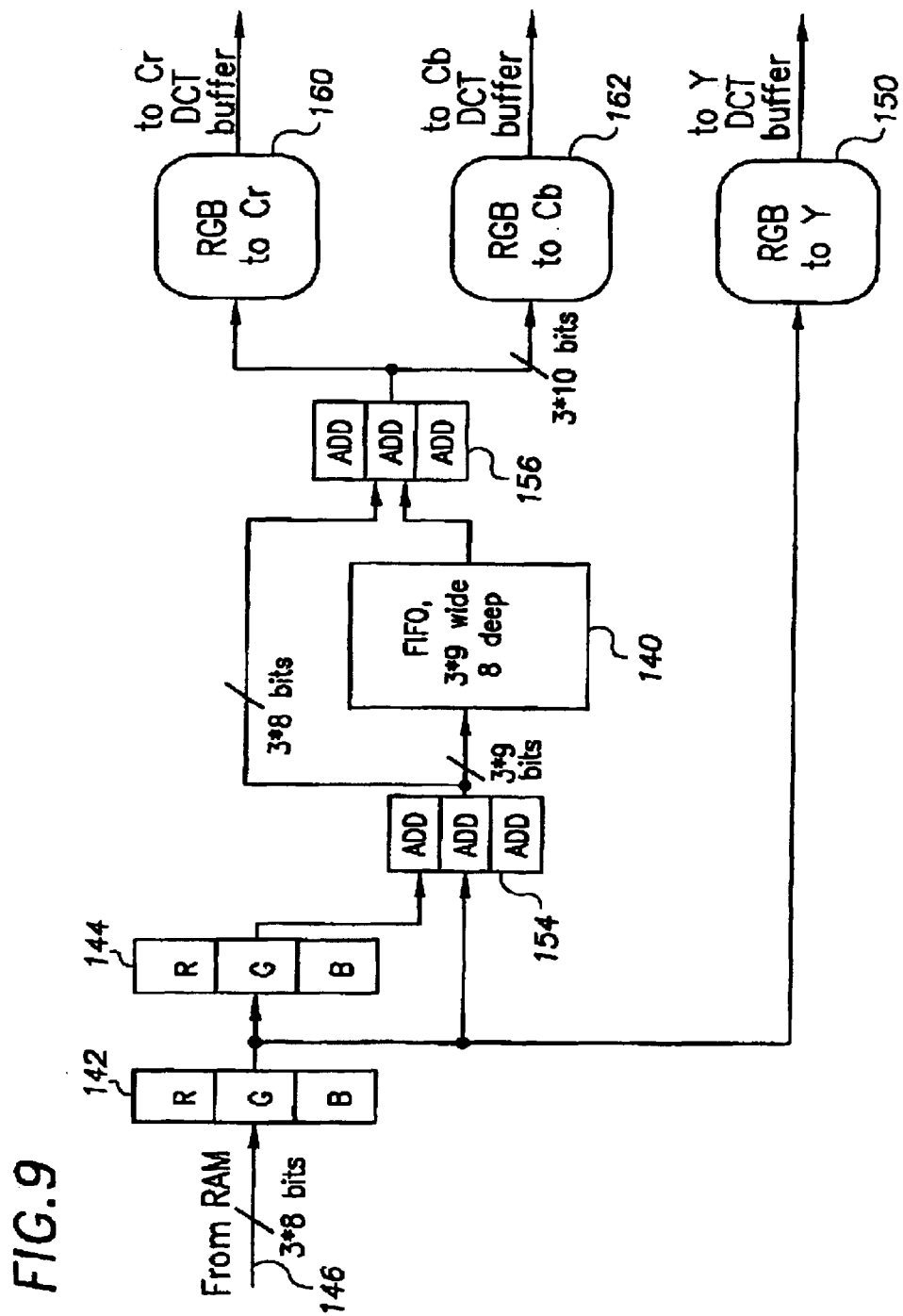
FIG. 9 is a block diagram of a circuit used to provide data flow between a RGB color space memory and a DCT buffer/memory accommodating the YCrCb color space, according to an example embodiment of the present invention.

FIG. 9 depicts the data flow for this word-by-word conversion using a 3*9 wide by 8 value-deep FIFO 140. To the left of the FIFO 140 are sequentially-oriented RGB buffers 142 and 144 which are fed from the SRAM using a 24-bit wide RGB bus 146. From the first RGB buffer 142, the RGB data is fed directly to the RGB-Y converter block 150 for the Y array (not shown in FIG. 9). For the Cr and Cb arrays, the RGB data is fed first to an adder circuit 154 which then stores the data, calculated as discussed above, as a FIFO value for later presentation to a second adder circuit 156. The second adder circuit 156 performs the next calculation using the sequentially-presented FIFO values and the computed data from the previous word as provided by the first adder circuit 154. The second adder circuit 156 provides its respective results to the RGB-Cr and RGB-Cb converter blocks 160 and 162. In this example implementation, precision is maintained using nine bits for each of the RGB values processed by the first adder circuit 154. With the FIFO carrying values that are nine bits wide, ten bits are used for each of the RGB values processed by the second adder circuit 156.

As an option to one or more of the above embodiments, monochrome data and YCrCb data can be directly compressed by the DCT block by disabling the above-discussed color conversion processes.

The various embodiments described above are provided by way of illustration only and are not intended to limit the invention. Those skilled in the art will readily recognize various modifications and changes that may be made to the present invention without strictly following the example embodiments and applications illustrated and described herein. For example, use of either a JPEG format or data compression/decompression is not necessarily required, as other applications may benefit from conversion between an RGB color space and a YCrCb color space using the present invention, the scope of which is set forth in the following claims.

What is claimed is:

1. A method for transferring data between an RGB color space memory and a YCrCb color space memory useful for presentation to a DCT block-computation engine, the method comprising:

providing at least two YCrCb intermediate buffers for storing data being transferred between the color space memories; and using the DCT block-computation engine to access data in one of the YCrCb intermediate buffers while using the other of the YCrCb intermediate buffers for data accesses of the RGB color space memory.

2. The method of claim 1, further including providing at least two RGB intermediate buffers for storing data being transferred between at least one of the YCrCb intermediate buffers and the RGB color space memory.

3. The method of claim 1, further including converting data between the RGB color space memory and the YCrCb color space memory block by block.

4. The method of claim 1, further including converting data between the RGB color space memory and the YCrCb color space memory line by line.

5. The method of claim 1, further including converting data between the RGB color space memory and the YCrCb color space memory word by word.

6. The method of claim 1, wherein the RGB data for a DCT in the YCrCb color space memory is four eight by eight Y arrays, one eight by eight Cr array and one eight by eight Cb array.

7. The method of claim 1, further including compressing the transferred data in the YCrCb color space memory.

8. The method of claim 1, further including decompressing the data in the YCrCb color space memory before using the DCT block-computation engine to access data stored in one of the YCrCb intermediate buffers.

9. A circuit arrangement for transferring data between an RGB color space memory and a YCrCb color space memory useful for presentation to a DCT block-computation engine, comprising:

at least two YCrCb intermediate buffers adapted for storing data being transferred between the color space memories; and means for using the DCT block-computation engine to access data in one of the YCrCb intermediate buffers while using the other of the YCrCb intermediate buffers for data accesses of the RGB color space memory.

10. A circuit arrangement for transferring data between an RGB color space memory and a YCrCb color space memory useful for presentation to a DCT block-computation engine, comprising:

a DCT block-computation engine;

at least two YCrCb intermediate buffers for storing data being transferred between the color space memories; and logic circuitry adapted to communicate data between the DCT block-computation engine data and one of the YCrCb intermediate buffers while using the other of the YCrCb intermediate buffers for data accesses of the RGB color space memory.

11. The circuit arrangement of claim 10, further including a processor programmed to convert data in the RGB color space memory to the YCrCb color space memory block by block.

12. The circuit arrangement of claim 10, further including a processor programmed to convert data in the RGB color space memory to the YCrCb color space memory line by line.

13. The circuit arrangement of claim 10, further including a processor programmed to convert data in the RGB color space memory to the YCrCb color space memory using word by word.

14. The circuit arrangement of claim 10, further including an RGB intermediate buffer for storing data being transferred between at least one of the YCrCb intermediate buffers and the RGB color space memory.

15. The circuit arrangement of claim 10, further including a second RGB intermediate buffer for storing data being transferred between at least one of the YCrCb intermediate buffers and the RGB color space memory.

16. The circuit arrangement of claim 10, further including an SDRAM configured and arranged to present RGB values from the RGB color space memory of the YCrCb intermediate buffers in multi-byte bursts.

17. The circuit arrangement of claim 10, wherein said at least two YCrCb intermediate buffers for storing data being transferred between the color space memories includes a Y intermediate buffer, a Cr intermediate buffer, and a Cb intermediate buffer.

18. The circuit arrangement of claim 10, wherein the logic circuitry includes an address calculator adapted to generate selected addresses for RGB values in the RGB color space memory, the selected addresses for the RGB values corresponding to noncontiguous memory locations in the RGB color space memory.

* * * * *